United States Patent [19]

Escaravage et al.

[11] Patent Number: 5,278,468
[45] Date of Patent: Jan. 11, 1994

[54] STRUCTURE FOR A DC MOTOR WITH AN ELECTRONIC COMMUTATION

[75] Inventors: Gérard Escaravage, Valentigney; Angelo Alberti, Audincourt, both of France

[73] Assignee: Ecia, France

[21] Appl. No.: 908,072

[22] Filed: Jul. 6, 1992

[30] Foreign Application Priority Data

Jul. 5, 1991 [FR] France .................... 91 08479

[51] Int. Cl.[5] .................... H02K 29/08; H02K 5/00
[52] U.S. Cl. .................... 310/71; 310/68 R; 310/234
[58] Field of Search .............. 310/40MM; 42, 66, 68.R, 71, 89, 90, 91, 234, DIG.6, 29/596; 439/879, 919

[56] References Cited

U.S. PATENT DOCUMENTS

| | | | |
|---|---|---|---|
| 4,357,552 | 11/1982 | MacMillan | 310/90 |
| 4,540,906 | 7/1985 | Blom | 310/67 R |
| 4,779,330 | 10/1988 | Genco et al. | 29/596 |
| 4,806,808 | 2/1989 | Grecksch et al. | 310/71 |
| 4,934,041 | 6/1990 | Hoover et al. | 29/596 |
| 5,157,293 | 10/1992 | Escaravage et al. | 310/71 |

FOREIGN PATENT DOCUMENTS

| | | |
|---|---|---|
| WO87/01879 | 3/1987 | European Pat. Off. . |
| 259724 | 3/1988 | European Pat. Off. . |
| 3442348 | 5/1986 | Fed. Rep. of Germany . |
| 2651933 | 9/1987 | France . |
| 2660124 | 3/1990 | France . |
| 2667202 | 9/1990 | France . |

Primary Examiner—Steven L. Stephan
Assistant Examiner—D. R. Haszko
Attorney, Agent, or Firm—Sughrue, Mion, Zinn, Macpeak & Seas

[57] ABSTRACT

The structure for a motor having a rotor (R) and a stator (S) comprises a support hub (10) with branches (11), a sleeve (12) and if desired a cover (13), a mandrel (20) with a tube (21) and a radially inwardly-extending flange (22), and a connector (30) in the shape of a frusto-conical ring (31). Application in automatically manufactured motors for the equipment of motor vehicles.

10 Claims, 3 Drawing Sheets

STRUCTURE FOR A DC MOTOR WITH AN ELECTRONIC COMMUTATION

BACKGROUND OF THE INVENTION

The present invention relates to dc motors with an electronic commutation and more particularly relates to the structure thereof.

DC motors with an electronic commutation comprise, among other elements, a housing which contains a wound armature from which a shaft extends. The commutation means for this armature, instead of being formed conventionally by an electromechanical device comprising a ring and brushes, are in this case formed by an electronic device with a control module connected to the fixed armature of the stator.

This type of motor usually presents delicate problems of manufacture, construction and assembly.

Indeed, windings must be formed and disposed in slots of the armature, then the ends of the wires of the winding coils of this armature must be connected to the electronic circuit of the control module, and, lastly, it must be possible to dissipate the heat of the power components of the electronic circuit of the control module.

A first source of difficulty is the formation of the winding coils of the armature when it is desired to proceed automatically and directly on the armature.

To ensure the connection of the ends of the wires of the winding coils to the electronic circuit of the control module, the ends of the wires are usually soldered to terminal connectors which are, or are not, directly associated with the electronic circuit Most of the time, bearing in mind the configuration of the structure of the motor, this soldering can only be carried out manually This is all the more delicate because each winding coil on principle requires two solders. Such an operation, which is particularly difficult to automate, is another source of difficulty since it requires very high skill and is time-consuming. Such solders are subject to faulty contacts.

Another source of difficulty is related to the existence of the electronic device which very often comprises power components which must be cooled so as to avoid their heating which would otherwise be destructive. This often leads to dividing up the electronic circuit in such manner that some of its components are no longer on the substrate of the printed circuit itself but are mounted directly on the housing so as to dissipate heat and improve ventilation. It will be easily understood that this also complicates the mounting and assembling operations and is also a source of bad workmanship.

Documents FR 89-11 771, FR 90-03 826 and FR 90-11 702 --(corresponding to French Patent Nos. 2651933, 2660124 and 2667202, respectively) disclose solutions-for overcoming this type of difficulties.

Another source of difficulty is also related to the design of the mechanical structure of this type of motor which is generally such that it is not possible to proceed automatically in its assembly and its mounting by simple operations with non-complex kinematics easy to carry out with the aid of robots or programmable automatons, since the components are numerous and have complicated configurations.

SUMMARY OF THE INVENTION

An object of the invention is to permit a practically total automation of the construction, the assembly and the mounting of such a motor resulting from the fact that these may be carried out with the aid of particularly simple kinematics which require only translations parallel to the axis of rotation of the motor.

Apart from this simplification and convenience, the design of this structure permits the use of electric supply and control means through a printed circuit whose substrate is devoid of a central opening, which increases the available area for the placement of components and connecting tracks.

Further, by means of the structure according to the invention, a single operation ensures the electric connection of the winding coils of the armature to the supply and control means.

The invention therefore provides a structure for a dc motor with an electronic commutation comprising, among other elements, a rotor having field means and a shaft, at least one bearing, and a stator having a wound armature carrying said bearing, and electric supply and control means for the wound armature. This structure is characterized in that it comprises a support hub with branches equipped with fixing means for securing the stator and with a hollow sleeve which is adapted to receive said bearing internally and coaxially and which has an end provided with retaining means, a mandrel with a tube for receiving said wound armature externally which is adapted to be mounted on said sleeve and is provided with a connection in rotation and with a radially inwardly extending flange which is provided with notches adapted to cooperate with said retaining means, and a connector in the shape of a ring which is adapted to be mounted externally on said tube of said mandrel so as to be immobilized in rotation by said connection in rotation and which is provided with cavities adapted to receive pins adapted to be put in electrical contact, on one hand, with the wound armature and, on the other hand, with said electric supply and control means.

Other features of the invention will be apparent from the following description and claims with reference to the accompanying drawing which is given solely by way of example and in which:

DESCRIPTION OF PREFERRED EMBODIMENTS

Figure 1:
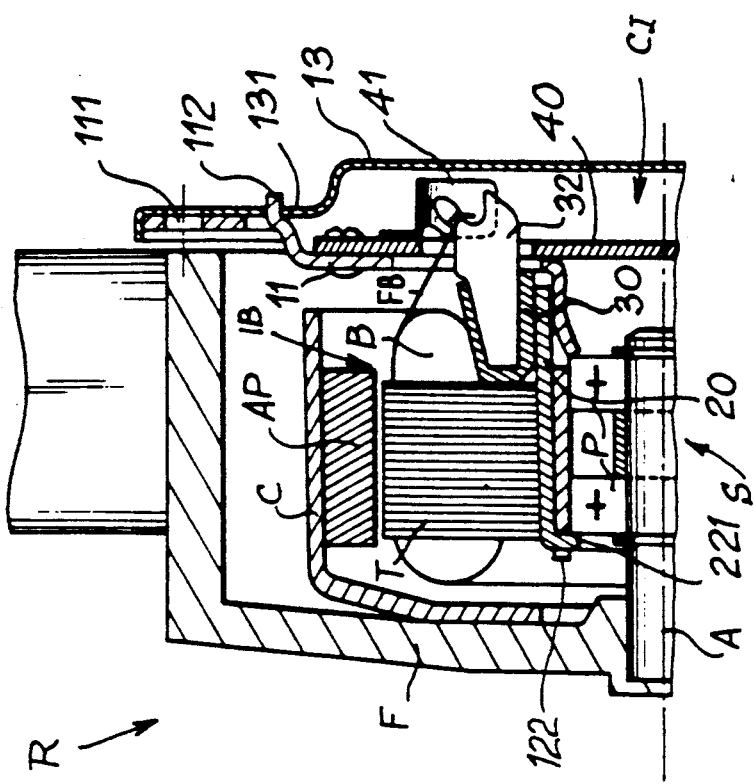
FIG. 1 is a diagrammatic partial radial sectional view of an embodiment of a motor having the structure according to the invention.

As dc current motors with an electronic commutation are well known in the art, only that which directly or indirectly concerns the invention will be described hereinafter. For the rest, one skilled in the art will draw from available current conventional solutions for resolving particular problems which arise.

The same reference character will always be employed hereinafter for identifying a similar element whatever the embodiment and alternative embodiment.

For convenience of description, each of the components of an embodiment of an improved structure according to the invention will be described in succession before explaining the mounting and assembly technique.

A dc motor with an electronic commutation comprises a rotor R and a stator S. The rotor comprises a yoke or frame C with field means, for example permanent magnets AP, and an end wall or bell F adapted to carry a shaft A supported by at least one bearing P. Associated with this frame is for example a blade structure or the like of a fan, as shown.

The stator comprises a wound armature IB made up of a stack of plates or laminations T on which are placed winding coils B disposed in slots in the conventional manner.

Such a motor is started up by electric supply and control means which most often comprise a printed circuit CI including an insulating substrate which carries electric conductors and on which are placed components including power components.

Figure 2:
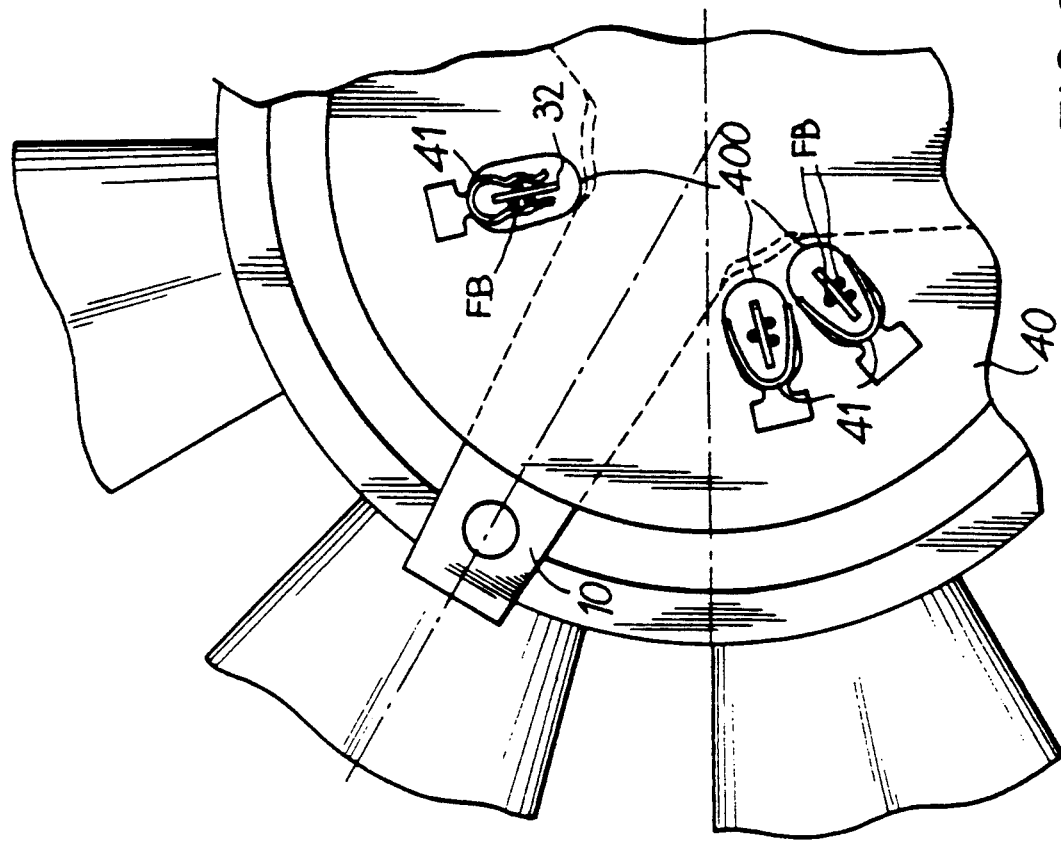
FIG. 2 is an end elevational view of the embodiment shown in FIG. 1 with parts in two different states of assembly.

All this is shown in particular in FIGS. 1 and 2.

To construct such a motor, an improved structure according to the invention is employed. This improved structure comprises in particular a support hub 10, a mandrel 20 and a connector 30.

Figure 3:
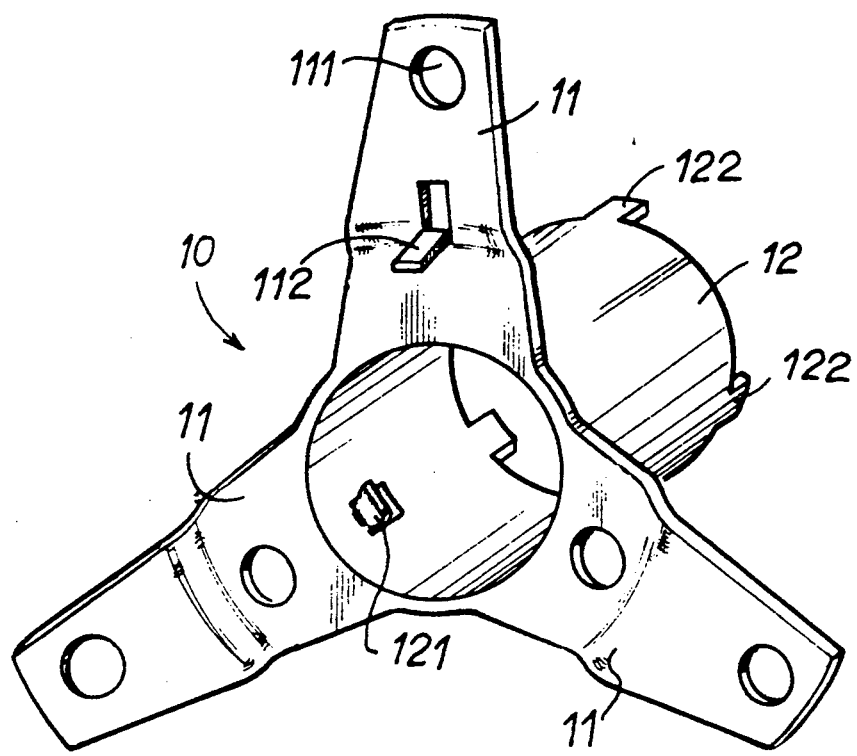
FIG. 3 is a diagrammatic perspective view of a support hub of the structure shown in FIG. 1.
Figure 4:
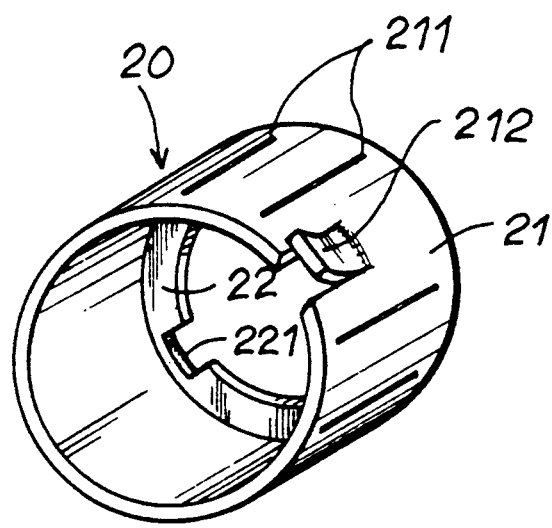
FIG. 4 is a diagrammatic perspective view of a mandrel of the structure shown in FIG. 1.
Figure 5:
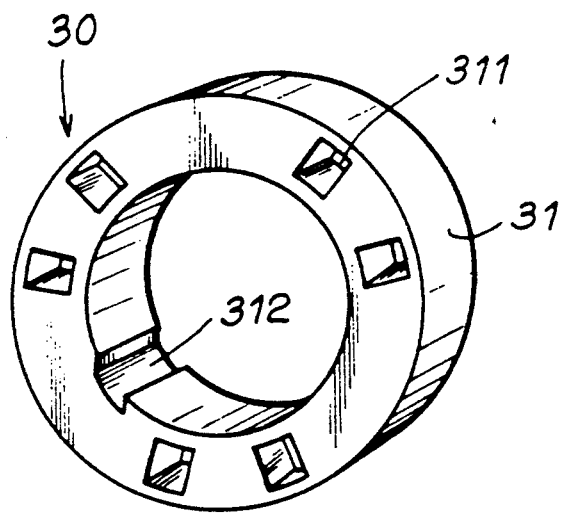
FIG. 5 is a diagrammatic perspective view of a connector of the structure shown in FIG. 1.

The support hub 10 comprises a plurality of radiating branches 11 which are for example equally spaced apart and connected to a sleeve 12. Each of the branches 11 carries, in the vicinity of its free end, fixing means 111, for example an aperture as shown or a screw, rivet or the like adapted to secure the motor, and in particular its stator, to a frame of an apparatus, for example a cooling or air-conditioning system of a motor vehicle when the frame of the rotor carries the blade structure of a fan as shown in FIGS. 1 and 2. These branches 11 are also provided with retaining means 112, such as lugs or the like the function of which will be explained hereinafter. The hollow sleeve 12 is adapted to receive the bearing P internally and coaxially. The sleeve 12 is provided internally with at least one stop 121 obtained for example by shearing and deformation which defines a small tab or the like, as clearly shown in FIG. 3. This stop serves to fix the relative axial positions of the sleeve 12 and the bearing or bearings P. The sleeve 12 further comprises, at one end, retaining means 122 such as tabs the function of which will be explained hereinafter.

Preferably, the support hub 10 is adapted to receive a cover 13 provided with orifices 131 adapted to receive the lugs 112, as shown in FIG. 1.

The mandrel 20 comprises a tube 21 carrying at one of its ends a radially inwardly extending flange 22. As shown in FIG. 1, the tube 21 is adapted to receive externally the wound armature IB and is adapted to be mounted on the sleeve 12. Externally, the tube 21 is provided with serrations, knurling or the like 211 for preventing rotation of the stack of plates or laminations T it receives. This tube 21 is also provided with a connection in rotation 212, such as a tongue or the like whose function will be explained hereinafter. The flange 22 is provided with notches 221 adapted to receive the tabs or the like 122 of the sleeve 12. This is shown in FIG. 1.

Figure 6A:
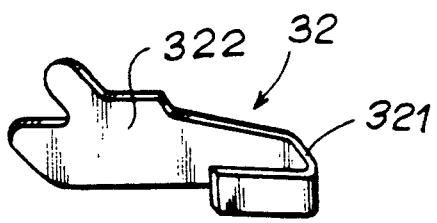
FIGS. 6A and 6B are diagrammatic perspective views of embodiments of a single pin (FIG. 6A) and a double pin (FIG. 6B) of the structure shown in FIG. 1.
Figure 6B:
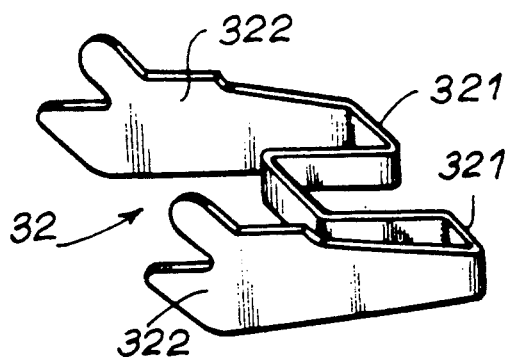
Figure 7:
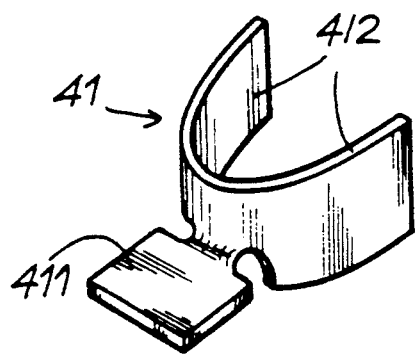
FIG. 7 is a diagrammatic perspective view of a stud of the structure shown in FIG. 1.

The connector 30 comprises mainly a frustoconical ring 31 (see FIG. 1 in particular) in which are provided cavities 311 and which has an internal groove or the like 312 adapted to cooperate with the tongue 212 for the purpose of relatively immobilizing in rotation the mandrel 20 and the connector 30. The cavities 31 are adapted to receive single pins 32 (FIG. 6A) or multiple pins, for example double pins (FIG. 6B). Each pin 32 comprises at least one foot 321 adapted to be inserted in a cavity and at least one strip or terminal connector 322 adapted for the attachment of the wires FB of the winding coils B of the armature (see FIGS. 1 and 2).

As shown in FIGS. 1 and 2, the substrate 40 of the printed circuit CI is provided with openings 400 and carries studs 41 close to the latter. These openings 400 are adapted to receive the pins 32 which cooperate with the studs 41. A stud 41 comprises a sole plate 411 adapted to be fixed to the substrate and connected to the conductor or counter-stud of the latter, and clamp arms 412. The manner in which the pins 32 and the studs 41 cooperate is shown in particular in FIGS. 1 and 2. When the wires or conductors FB of the winding coils B are attached to the strips 322 of a pin 32, the clamp arms 412 of a stud 41 are urged toward each other and clamp and trap the wires and maintain them against the strip. A solder renders the electrical connection more reliable and mechanically non-bendable if necessary. In FIG. 2, the clamp arms are shown before they are moved toward each other in the lower half of FIG. 2, and after they have been moved toward each other in the upper half of FIG. 2.

FIG. 1 shows that the various components of the structure according to the invention may be engaged one inside the other merely by axial translations, and, once the assembly has been achieved, it is sufficient to fold over or crush the lugs 112 and the tabs or the like 122 to maintain the whole mechanically assembled with the electric connections achieved.

It will be observed that the cover protects the inner parts of the motor against dust and splashing of liquid and gives the final appearance thereto.

All the advantages afforded by the improved structure according to the invention will be clear from the foregoing. Note in particular that it is possible to reduce the axial overall size of the motor in particular owing to the sliding of the ring of the connector, which allows the winding of the armature, and to the pins which permit making the electric connections without the ends of the wires being "in the air" or "in the open" when awaiting connection.

What is claimed is:

1. Structure for an electronically commutated dc motor comprising: a rotor having an axis of rotation, field-generating means and a shaft; at least one bearing; a stator having a wound armature carrying said bearing; and electric supply and control means for controlling and supplying electrical energy to said wound armature;

said structure comprising:
an axially translatable support hub having branches, provided with fixing means for securing said stator, and a hollow sleeve internally and coaxially receiving said bearing and including retaining elements at an end of said sleeve;

an axially translatable mandrel comprising a tube externally receiving said wound armature and mounted on said sleeve;

a connection in rotation provided on said sleeve;

a radially inwardly-extending flange provided on said mandrel and defining notches which are cooperative with said retaining elements to retain said mandrel on said sleeve:

an axially translatable connector in the shape of a ring mounted externally on said tube of said mandrel and immobilized in rotation by said connection in rotation;

cavities provided in said ring; and pins extending into said cavities and adapted to being put in electric contact with winding coils of said wound armature and with said electric supply and control means;

whereby said motor is assembleable by translations of said support hub, said mandrel and said connector in only directions that are parallel to said axis of rotation.

2. Structure according to claim 1, wherein said connection in rotation comprises a tongue on said tube and a groove in said ring.

3. Structure according to claim 1, wherein said retaining elements or said sleeve comprise axially extending tabs bent over in said notches of said flange of said mandrel.

4. Structure according to claim 1, wherein said pins each comprise at least one mounting foot inserted in a respective one of said cavities of said ring and at least one strip for the attachment of wires of said winding coils of said armature 5. Structure according to claim 1, wherein said electric supply and control means are carried by a printed circuit having a substrate provided with openings and carrying studs in proximity to said openings, said pins extending through said openings and being cooperative with said studs.

6. Structure according to claim 5, wherein said pins each comprise at least one mounting foot inserted in a respective one of said cavities of said ring and at least one strip for the attachment of wires of said winding coils of said armature, and said studs comprise a sole plate electrically connected to said printed circuit and clamp arms for clamping said wires of said winding coils of said armature on said at least one attachment strips of said pins.

7. Structure according to claim 1, wherein said sleeve comprises at least one inner stop cooperative with said bearing.

8. Structure according to claim 1, wherein said branches of said support hub include retainers for retaining a cover.

9. Structure according to claim 8, wherein said retainers are axially extending lugs capable of being bent over in apertures provided in said cover.

10. The structure according to claim 5, wherein said substrate is axially spaced from an adjacent end of said shaft and is devoid of any central opening for said shaft.

* * * * *